(12) United States Patent
Folks et al.

(10) Patent No.: US 10,300,832 B1
(45) Date of Patent: May 28, 2019

(54) AUTOMATED TECHNIQUE FOR CONFIGURING STORAGE SPACE

(71) Applicant: Apple Inc., Cupertino, CA (US)

(72) Inventors: Jonathon Folks, Cupertino, CA (US); John J. Baker, Campbell, CA (US); Jun Wooung Jeong, San Francisco, CA (US); Andrew W. Kooker, San Francisco, CA (US); Craig Ogden, Pleasanton, CA (US); Lukas Satas, San Jose, CA (US); David Yates, Cupertino, CA (US)

(73) Assignee: APPLE INC., Cupertino, CA (US)

(*) Notice: Subject to any disclaimer, the term of this patent is extended or adjusted under 35 U.S.C. 154(b) by 63 days.

(21) Appl. No.: 15/706,609

(22) Filed: Sep. 15, 2017

Related U.S. Application Data (60) Provisional application No. 62/396,678, filed on Sep. 19, 2016.

(51) Int. Cl.
| | |
|---|---|
| *B60N 2/60* | (2006.01) |
| *B60P 3/42* | (2006.01) |
| *G06F 9/44* | (2018.01) |
| *B60N 2/06* | (2006.01) |
| *B60N 2/36* | (2006.01) |

(52) U.S. Cl.
CPC ............ *B60P 3/423* (2013.01); *B60N 2/06* (2013.01); *G06F 9/44* (2013.01); *B60N 2002/363* (2013.01)

(58) Field of Classification Search
CPC ...... G01S 5/02521; G01S 5/0226; G06F 9/44; B60P 3/423; B60N 2/30; B60N 2/06; B60N 2002/363

USPC .......................................... 296/181.3, 65.03
See application file for complete search history.

(56) References Cited

U.S. PATENT DOCUMENTS

| | | | | |
|---|---|---|---|---|
| 9,597,983 | B2* | 3/2017 | Strasdat | B60R 7/04 |
| 9,776,546 | B2* | 10/2017 | Song | B60P 1/165 |
| 10,078,794 | B2* | 9/2018 | Pierce | G06K 9/4671 |
| 2008/0157940 | A1* | 7/2008 | Breed | B60C 11/24 |
| | | | | 340/425.5 |
| 2015/0094876 | A1* | 4/2015 | Baldwin | G06Q 50/28 |
| | | | | 701/1 |
| 2016/0343176 | A1* | 11/2016 | Ackley | G06K 9/18 |
| 2017/0120932 | A1* | 5/2017 | Szczerba | B60W 50/10 |
| 2017/0210322 | A1* | 7/2017 | Rao | B60R 21/01554 |
| 2018/0059209 | A1* | 3/2018 | Cuddihy | G01S 5/0226 |
| 2018/0105076 | A1* | 4/2018 | Dry | B60N 2/0248 |

* cited by examiner

*Primary Examiner* — Pinel E Romain
(74) *Attorney, Agent, or Firm* — Dentons US LLP (57) ABSTRACT

A method for storing cargo items includes determining characteristics of a cargo space, where the cargo space includes at least one seat and the at least one seat is capable of being moved between a first position within the cargo space and a second position within the cargo space. A set of cargo items including one or more cargo items to be positioned in the cargo space is determined. A configuration of the cargo space is determined based at least in part on the set of cargo items, where the configuration of the cargo space includes the second position of the at least one seat. A layout of the set of cargo items within the cargo space is determined based at least in part on the set of cargo items and the determined configuration, and the at least one seat is moved from the first position to the second position.

21 Claims, 5 Drawing Sheets

AUTOMATED TECHNIQUE FOR CONFIGURING STORAGE SPACE

RELATED APPLICATIONS

This application claims priority from U.S. Provisional Patent Application Ser. No. 62/396,678, filed Sep. 19, 2016, entitled "AUTOMATED TECHNIQUE FOR CONFIGURING STORAGE SPACE," which is incorporated herein by reference in its entirety.

FIELD

The present disclosure relates generally to storing cargo items in a configurable cargo space, and more specifically to techniques for determining a configuration of the cargo space and a layout of the cargo items for storing and/or transporting the cargo items.

BACKGROUND

Vehicles such as automobiles provide a means of transportation for people (e.g., the driver and passenger(s)) and to move cargo. Vehicles intended for human transportation (passenger vehicles) typically include seats in which passengers can sit. The position of passenger seats can typically be adjusted to some extent. For example, seats typically can be translated forward and backward, and the inclination of the seat back can be varied. Passenger vehicles may include some amount of space in which cargo items can be placed for transportation (e.g., a back seat or trunk). Vehicles intended for moving a significant amount of cargo commonly include a dedicated, relatively unobstructed cargo area, such as a trailer, truck bed, or the like, that is separate from the space intended for operators/passengers (e.g., the cabin of a truck).

There is also a significant amount of research and development being devoted to the area of self-driving or self-navigating vehicles. Similar to traditional vehicles, self-driving vehicles may be designed to accommodate both people and other cargo items.

Although many vehicles provide the ability to transport passengers and cargo, the configuration of such vehicles is generally not optimal for transporting both. For example, seats for passengers (as well as other passenger accommodations such as arm rests, cupholders, etc.) occupy space in the vehicle that cannot be used for transporting other items. Furthermore, existing vehicles cannot be efficiently reconfigured or adapted to be better suited for one purpose or the other based on current need. The extent to which the position and configuration of seats in passenger vehicles can be adjusted is typically limited. This makes it difficult and time-consuming to reconfigure a vehicle that is designed primarily to transport passengers such that it is optimized for transporting cargo. Furthermore, to the extent that existing vehicles can be reconfigured, it is difficult to determine the optimal configuration of the vehicle and layout of the cargo to be transported, which both depend on the characteristics (e.g., size, shape, mass, value, compressibility) of the cargo one wishes to transport.

BRIEF SUMMARY

The present disclosure provides more efficient techniques for determining the optimal vehicle configuration and layout of items to be transported in view of the ability of the vehicle to be reconfigured and the characteristics of the items to be transported. The ability to optimally and efficiently configure a vehicle and determine a layout for cargo items can save time, allow more cargo to be fit into a vehicle, and reduce the need for additional vehicles or trips.

In addition, self-driving or autonomous vehicles may not require many of the interior features required in a traditional car. For example, a front driver's seat, steering wheel, and dashboard may not be required. In particular, this reduces the constraints on the positions of seats within the vehicle and may allow the seats to be moved around and positioned in ways that are not feasible in traditional vehicles.

In some embodiments, a method is performed at an electronic device with one or more processors, memory, and a first sensor. The method includes determining, using the one or more processors and based on the first sensor, characteristics of a cargo space, where the cargo space includes at least one seat, and where the at least one seat is capable of being moved between a first position within the cargo space and a second position within the cargo space. A set of cargo items is determined using the one or more processors, where the set of cargo items include one or more cargo items to be positioned in the cargo space. A configuration of the cargo space is determined using the one or more processors and based at least in part on the set of cargo items, where the configuration of the cargo space includes the second position of the at least one seat. A layout of the set of cargo items within the cargo space is determined using the one or more processors and based at least in part on the set of cargo items and the determined configuration. A signal is provided, using the one or more processors, to cause the at least one seat to move from the first position to the second position.

In some embodiments, a device is described. The device includes a first sensor, one or more processors, and a memory storing one or more programs. The one or more programs are configured to be executed by the one or more processors. The one or more programs include instructions for determining, based on data from the first sensor, characteristics of a cargo space, where the cargo space includes at least one seat, and where the at least one seat is capable of being moved between a first position within the cargo space and a second position within the cargo space. The one or more programs include instructions for determining a set of cargo items including one or more cargo items to be positioned in the cargo space, and for determining a configuration of the cargo space based at least in part on the set of cargo items, where the configuration of the cargo space includes the second position of the at least one seat. The one or more programs further include instructions for determining a layout of the set of cargo items within the cargo space based at least in part on the set of cargo items and the determined configuration. The one or more programs further include instructions to provide a signal to cause the at least one seat to move from the first position to the second position.

In some embodiments, a non-transitory computer-readable storage medium storing one or more programs is described. The one or more programs are configured to be executed by one or more processors of an electronic device with a first sensor. The one or more programs include instructions for determining, based on data from the first sensor, characteristics of a cargo space, where the cargo space includes at least one seat, and where the at least one seat is capable of being moved between a first position within the cargo space and a second position within the cargo space. The one or more programs include instructions for determining a set of cargo items including one or more cargo items to be positioned in the cargo space, and for determining a configuration of the cargo space based at least in part on the set of cargo items, where the configuration of the cargo space includes the second position of the at least one seat. The one or more programs further include instructions for determining a layout of the set of cargo items within the cargo space based at least in part on the set of cargo items and the determined configuration. The one or more programs further include instructions for providing a signal to cause the at least one seat to move from the first position to the second position.

These techniques allow for more efficiently determining the optimal vehicle configuration and layout of items to be transported in view of the ability of the vehicle to be reconfigured and the characteristics of the items to be transported thereby saving time and reducing the need for additional vehicles or trips. Such techniques may complement or replace other methods for configuring a vehicle and positioning cargo for transportation.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first position could be termed a second position, and, similarly, a second position could be termed a first position, without departing from the scope of the various described embodiments. The first position and the second position are both positions, but they are not the same position.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
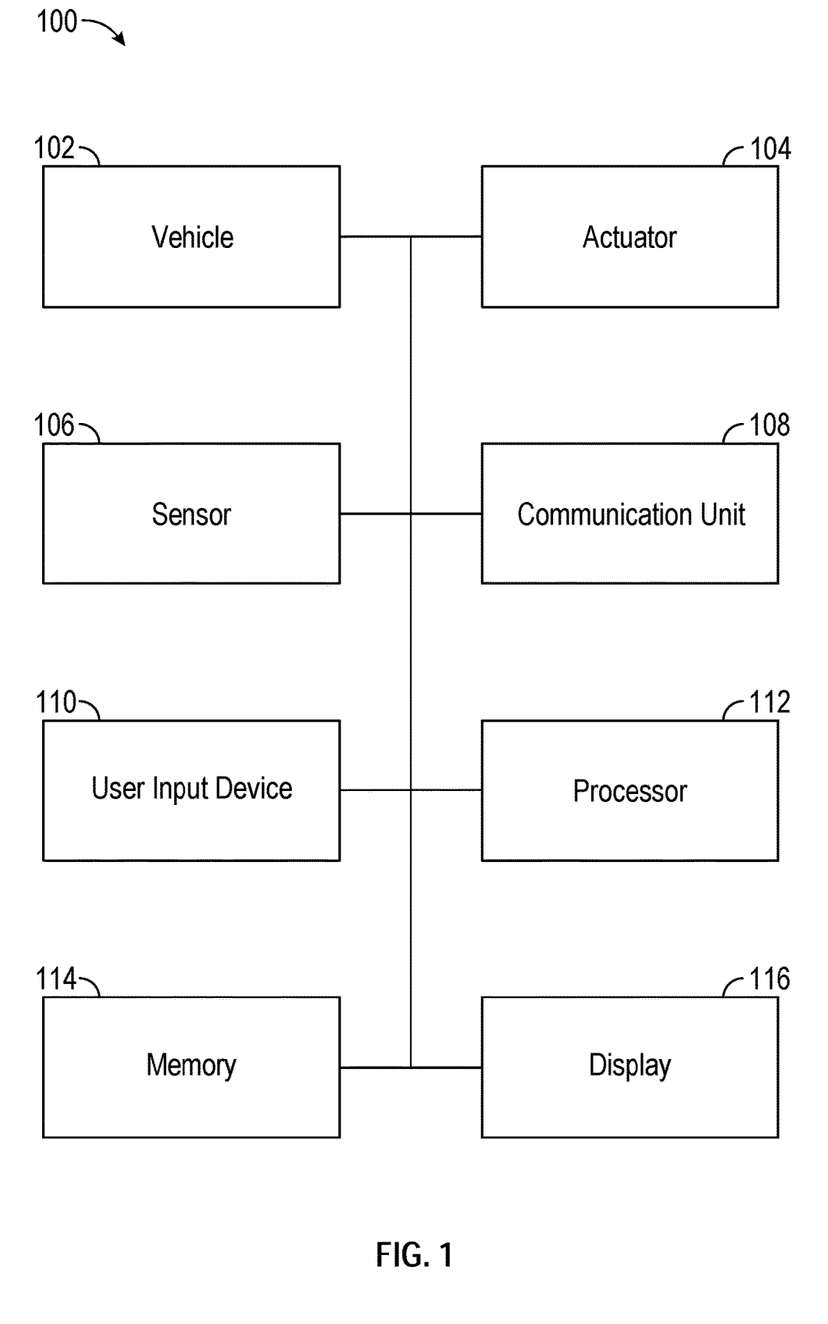
FIG. 1 is a functional block diagram of an exemplary system in accordance with some embodiments.

FIG. 1 illustrates an exemplary functional block diagram of a system 100 in accordance with some embodiments. In accordance with some embodiments, the functional blocks of system 100 are configured to perform the techniques described below. The functional blocks of system 100 are, optionally, implemented by hardware, software, or a combination of hardware and software to carry out the principles of the various described examples. It is understood by persons of skill in the art that the functional blocks described in FIG. 1 are, optionally, combined or separated into sub-blocks to implement the principles of the various described examples. Therefore, the description herein optionally supports any possible combination or separation or further definition of the functional blocks described herein.

System 100 includes a vehicle 102, actuator 104, sensor 106, communication unit 108, user input device 110, processor 112, memory 114, and display 116.

Exemplary actuators include, but are not limited to, a mechanical and/or electrical actuator for adjusting the state (e.g., position) of items associated with the vehicle 102, such as, for example, seats, windows, doors, locks, hooks, connectors, barriers, nets, and the like. Exemplary sensors include, but are not limited to, a visible or infrared imager, radar, laser range finder, sonar, and scanner (e.g., barcode and/or quick response code scanner). Communication unit 108 includes wireless communication capability (e.g., short-range communication, Bluetooth, WiFi, cellular, satellite) and/or a wired communication interface (e.g., USB, PCI bus, SCSI bus). Exemplary user input devices include, but are not limited to, keyboards, mice, touchscreens, speakers, cameras, buttons, switches, joysticks, trackballs, and the like. Exemplary displays include, but are not limited to, monitors, LCD displays, and touchscreens. In some embodiments, processor 112 is included in a server, desktop computer, laptop, smartphone, or other electronic device.

Figure 3:
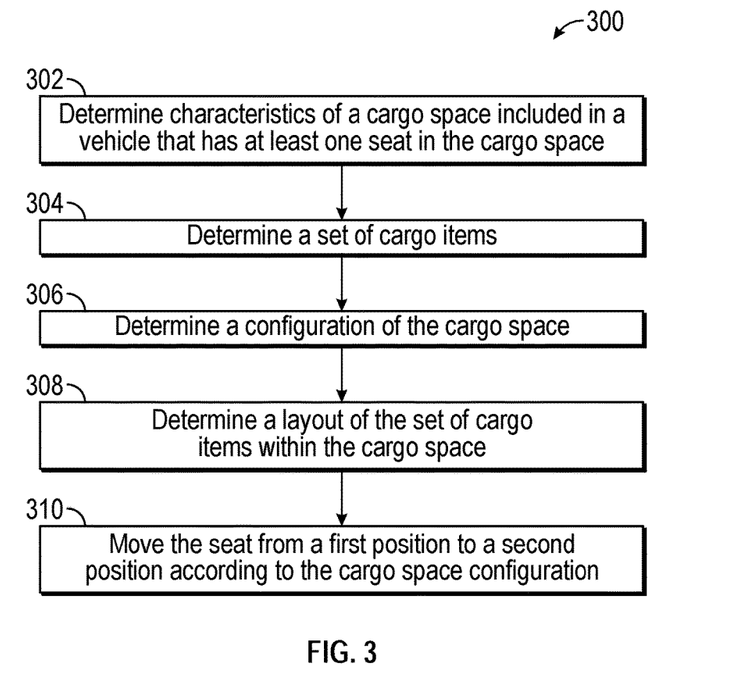
FIG. 3 is a flow diagram illustrating a process for configuring a cargo space and arranging cargo items in the cargo space in accordance with some embodiments.

Memory 114 may be in the same device as processor 112 or a separate device. Memory 114 optionally includes one or more non-transitory computer-readable storage mediums for storing computer-executable instructions, which, when executed by one or more computer processors 112, for example, can cause the computer processors to perform the techniques described below, including process 300 (FIG. 3). The computer-readable storage mediums may be tangible and non-transitory. Memory 114 may include high-speed random access memory and may also include non-volatile memory, such as one or more magnetic disk storage devices, optical storage devices (e.g., optical discs based on CD, DVD, or Blu-ray technologies), flash memory devices, or other non-volatile solid-state memory devices.

In some embodiments, one or more of the sensor 106, communication unit 108, user input device 110, processor 112, memory 114, and display 116 are integrated into vehicle 102. In some embodiments, one or more of these elements are included in a standalone device (e.g., a smartphone) or a server remote to the vehicle 102.

Figure 2:
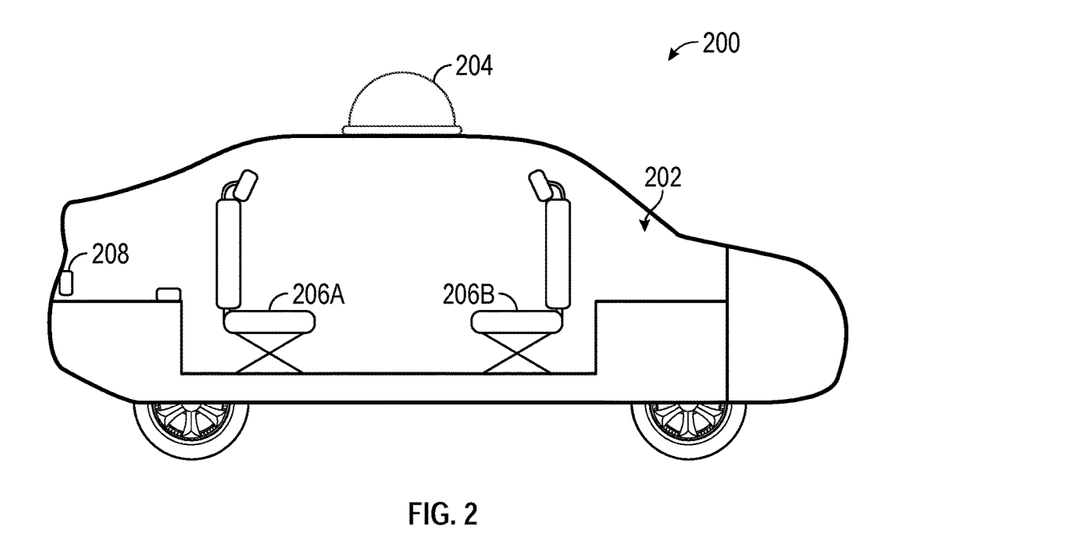
FIG. 2 illustrates an exemplary vehicle for transporting cargo items in accordance with some embodiments.

FIG. 2 illustrates an exemplary vehicle 200 having a cargo space 202 in accordance with some embodiments. Vehicle 200 may be a fully-automated or semi-automated vehicle with self-navigating features (e.g., an autonomous vehicle, driverless car, self-driving car). One or more of sensors 204 are configured to obtain environmental data that are used for vehicle navigation and/or automated control of the vehicle.

In FIG. 2, the cargo space 202 is a single, undivided space. In some embodiments, the cargo space includes two or more spaces that are separated by a physical barrier. For example, cargo space of a vehicle may include the combination of one or more of a passenger cabin, a rear trunk, and a front under hood storage space (e.g., a frunk). In some embodiments, the analysis and reconfiguration performed below can be adapted to be performed with respect to cargo spaces in two or more vehicles.

FIG. 3 is a flow diagram illustrating a process 300 for configuring a cargo space and arranging cargo items in a cargo space in accordance with some embodiments. Process 300 can be performed by a system such as system 100 illustrated in FIG. 1. Some operations in method 300 are, optionally, combined, the order of some operations are, optionally, changed, and some operations are, optionally, omitted.

At block 302, characteristics of a cargo space (e.g., 202) in which cargo items may be placed for storage and/or transportation are determined. Characteristics of the cargo space include, but are not limited to, the size and shape of the cargo space. Characteristics of the cargo space may also include handles, tie-down points, restraints, windows, doors, and/or other structures or features associated with the cargo space, including the position or other properties of these structures or features. In some examples, such features affect the manner in which cargo items can be stored and/or transported by the vehicle. In some embodiments, the characteristics of the cargo space are predetermined and stored in memory (e.g., memory 114). In some embodiments, a user input is received (e.g., with user input device 110) that specifies one or more characteristics of a cargo space. In some examples, a user identifies one or more vehicles (e.g., make, model, version, type, etc.), and characteristics of cargo space(s) associated with the one or more vehicles is obtained from memory (e.g., 114) or a remote server.

In FIG. 2, the cargo space 202 in vehicle 200 includes seats 206A and 206B. Seats 206A and 206B can occupy various positions within cargo space 202. The "position" of the seat optionally includes a location, orientation, and/or configuration of the seat. The location of the seat can be represented, for example, by a coordinate, point, area, or volume within the cargo space 202. In some embodiments, the seat can occupy any location along a defined path, in a defined plane, or within a defined space. In some embodiments, a seat can only occupy a set of discrete locations along a defined path, in a defined plane, or within a defined space. In some embodiments, the seat can occupy any location within a specified range but only a set of discrete locations within another specified range (e.g., A<x<B, x=C, or x=D, where C and D are each less than A or greater than D).

The orientation of a seat can represent the angular orientation of the seat (e.g., relative to a frame of reference of the vehicle). The orientation may also be described qualitatively (e.g., forward facing, rearward facing, etc.). In some embodiments, the seat can be oriented in any orientation within a defined range of orientations (e.g., the available orientations may be continuous within a specified range). In some embodiments, a seat can only be oriented in a set of discrete orientations. In some embodiments, the seat can occupy any orientation within a specified range but only a set of discrete orientations within another specified range.

The configuration of the seat (a.k.a. "seat configuration") can refer to the manner in which the seat is configured. For example, a seat may be configured with the seatback in an upright, reclined, or folded down configuration. A seat may also be in a stowed configuration, either horizontally or vertically. Various other seat configurations may be possible (e.g., retracted, laid flat, etc.). In some embodiments, a seat can be configured in any state within a defined range (e.g., any seatback inclination from 0 degrees to 180 degrees, relative to the base of the seat). In some embodiments, a seat can only be configured in a set of discrete configuration states (e.g., 0 degrees, 90, degrees, and 180 degrees, relative to the base of the seat). In some embodiments, the seat can be configured in any state within a specified range and only a set of discrete states within another specified range (e.g., 0 degrees, anywhere between 80 degrees and 110 degrees, or 180 degrees, relative to the base of the seat). A seat may include components such as armrests, headrests, or the like, the position(s) of which may also be included in the seat configuration.

Figure 4A:
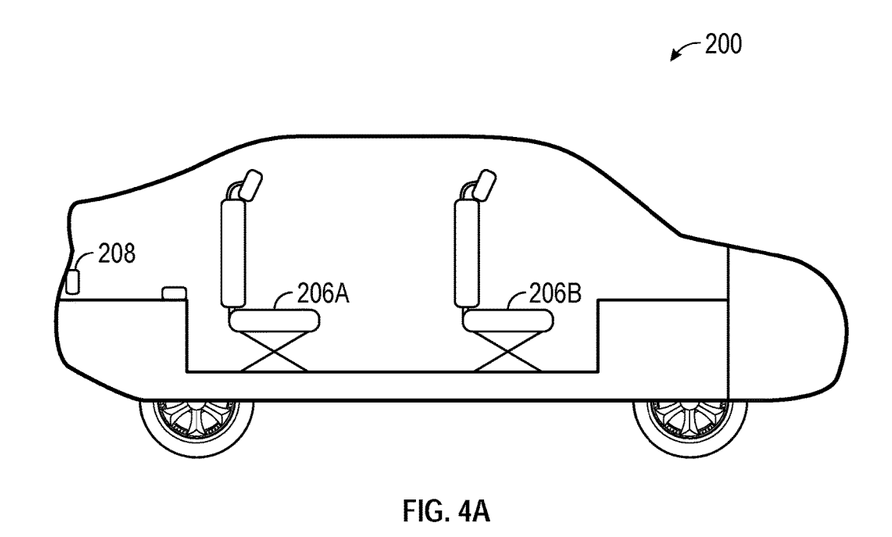
FIGS. 4A-4C illustrate an exemplary vehicle for transporting cargo items in accordance with some embodiments.
Figure 4B:
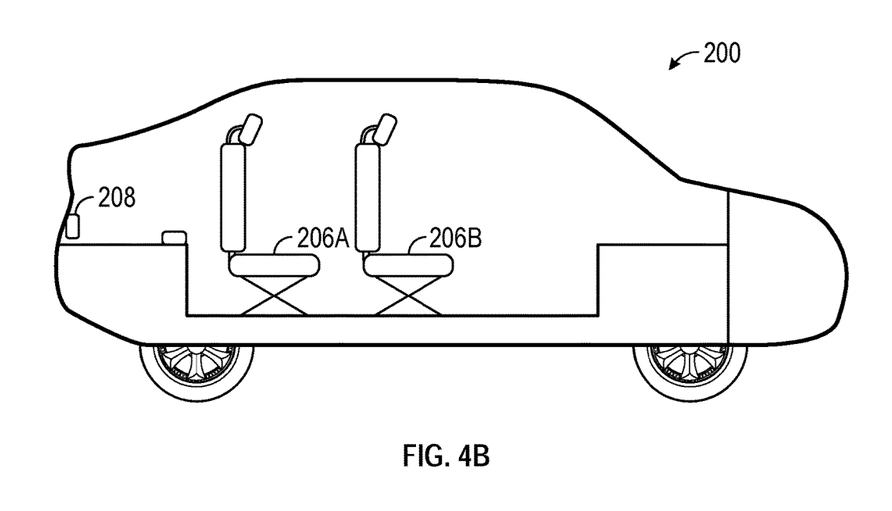
Figure 4C:
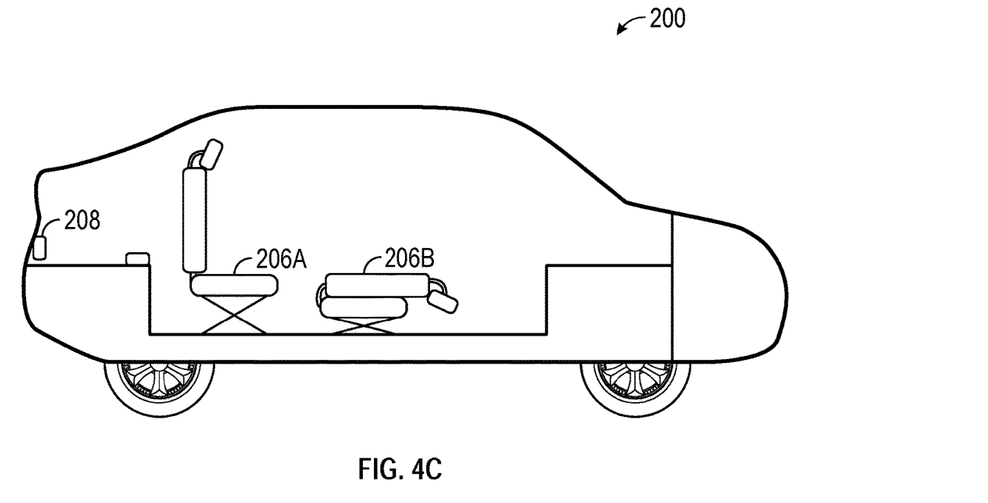

In FIG. 2, seat 206B is in a position with a first location on the right side of vehicle 200 (as depicted), a first orientation (e.g., rearward facing, assuming the front of vehicle 200 is on the right side of FIG. 2), and a first configuration (e.g., upright). Examples of other seat positions are illustrated in FIGS. 4A-4C. For example, seat 206B may be configured to be rotated to a second position with a second orientation (e.g., forward facing) while remaining in the same first location, as depicted in FIG. 4A. As shown in FIG. 4B, the location of seat 206B can also be changed from the first location in FIGS. 2 and 4A to a third position having a second location near the center of vehicle 200. FIG. 4C illustrates seat 206B in yet a fourth position that has a second configuration (e.g., horizontally stowed).

FIG. 2 also illustrates attachment points 208 which may be used to tie-down cargo items or to which cargo items may otherwise be attached.

Returning to FIG. 3, at block 304, a set of cargo items to be placed in the cargo space is determined. A set of cargo items is optionally determined at least in part by receiving data representing the cargo items. In some examples, in system 100, data representing the cargo items is received via user input device 110 and/or communication unit 108. For example, a user may identify cargo items to be transported by using a graphical user interface and/or speech recognition system provided by user input device 110. In some examples, a user selects items using an application on a remote device such as a smartphone, desktop computer, or laptop computer which sends the data representing the selected cargo items to system 100 and received by communication unit 108. In some examples, the set of cargo items is determined at least in part by using one or more of sensor (e.g., sensor 106 or 204). System 100, for example, receives instructions to use sensors 106 to scan an area for potential cargo items.

Figure 5:
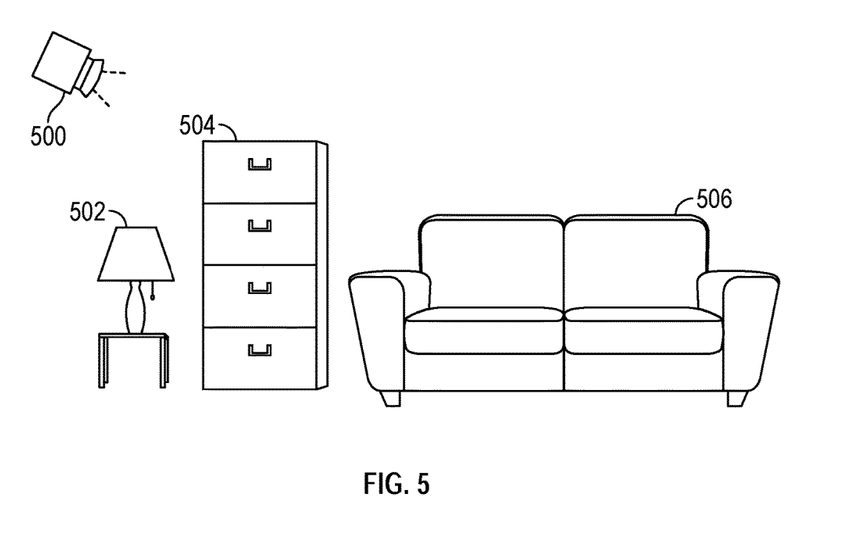
FIG. 5 illustrates an exemplary sensor and cargo items in accordance with some embodiments.

FIG. 5 illustrates an exemplary sensor 500 (e.g., a camera) scanning potential cargo items, including lamp 502, file cabinet 504, and sofa 506. A three-dimensional map of the scanned area is generated, including any cargo items in the area (e.g., 502, 504, and 506). As another example, in FIG. 2, a user may obtain items to be transported (e.g., 502, 504, and 506) and place them in the vicinity of vehicle 200. The system 100 receives user input to instruct sensor 204 to scan the area surrounding vehicle 200, including the cargo items. The system 100 optionally receive the user input via a user interface integrated into vehicle 200 or an application on a device (e.g., a smartphone, desktop computer, or laptop computer) in communication with the vehicle 200 and/or sensor 204. The sensor data obtained from the scan is optionally used to identify the cargo items.

One or more of the same sensors that are used for vehicle navigation (e.g., 204) may also be used to determine the set of cargo items. This optionally allows the techniques described herein to be implemented on an existing self-driving vehicle without requiring additional sensors. In some embodiments, however, a vehicle includes additional sensors to facilitate the cargo item determination and/or identification features described herein.

Sensors on a separate device (e.g., a camera, smartphone, desktop computer, or laptop computer) other than a vehicle (e.g., vehicle 102) can also be used to scan a cargo item. The separate device may be part of system 100 or a remote device in communication with system 100 (e.g., via communication unit 108). The scan data obtained by the separate device can be processed (e.g., by processor 112) to identify cargo items. Alternatively, the scan data can be processed by a program or application running on a remote device or external server, which then sends data representing the cargo items to system 100.

Determining the set of cargo items may include determining one or more characteristics of a cargo item that are used to determine where and how the cargo item can or should be placed in the cargo area. Exemplary characteristics of a cargo item include the size, shape, and mass of the cargo item. Other exemplary characteristics of a cargo item include, but are not limited to, the type of object (e.g., chair, sofa, box, etc.), compressibility (e.g., whether an object can be compressed without being damaged), value (e.g., a monetary value or a subjective value such as "important"), material (e.g., metal, cloth, etc.), and fragility (e.g., how likely an item is to be damaged if subject to an impact or being compressed). A cargo item may also include a characteristic associated with its ability to be secured or tied down. This may include specific fasteners (e.g., mechanical or magnetic clamps) or techniques that can be used to secure the item. A cargo item can also be characterized as a module that is specifically designed for a cargo space. For example, a module can include an interface (e.g., a custom fastener) that is complimentary to an interface provided in the cargo space for securing the cargo item. A cargo item can also be characterized as having various configurations. Exemplary cargo item configurations include, but are not limited to, folded, bent, laid flat, opened, closed, twisted, compressed, and stretched.

The one or more characteristics of the cargo items may be determined based at least in part on data obtained by sensors, as described above. For example, system 100 may determine the size and shape (or other characteristics) of a cargo item in the vicinity of vehicle 102 by scanning the cargo item with sensors 106 and creating a three-dimensional model of the item. In some embodiments, the mass of a cargo item is determined or estimated based at least in part on the sensor data. In another example, a remote device (e.g., a smartphone including a camera) is used to capture images of the cargo item, and a program or application on the remote device creates a three-dimensional mapping of the cargo item to determine one or more characteristics, which are sent to system 100. Alternatively, the remote device sends images of the cargo item to a remote server or system 100 to identify the cargo item and/or determine characteristics of the cargo item, which are then sent to system 100.

A characteristic of a cargo item is also optionally determined at least in part by obtaining information about the item from a user input (e.g., via an input to a graphical or audible user interface, such as user input device 110) and/or a database. In some embodiments, a user can specify the size, shape, mass, or other characteristics of a cargo item. In another embodiment, an identifier of a cargo item can be obtained (e.g., via a user input or by scanning a barcode, quick response code, or the like, associated with the cargo item) and used to obtain characteristics of the cargo item from a database.

Information provided by a user (e.g., via a graphical or audible user interface) and/or information obtained from a database is also optionally used to estimate a characteristic of an item, including any of the characteristics described above. For example, sensor data is combined with user input indicating that an item is a chair to estimate the mass of the chair based on a probabilistic calculation.

Referring again to FIG. 3, at blocks 306 and 308, a configuration of the cargo space and a layout of the set of cargo items within the cargo space are determined. The configuration of the cargo space and/or the layout of the set of cargo items may be determined based at least in part on the set of cargo items. The configuration of the cargo space and/or a layout of the set of cargo items may also be based at least in part on the characteristics (e.g., size and shape) of the cargo space, including the possible positions of any seats and other features included in the cargo space. In system 100, the configuration of the cargo space includes the positions of any seats (e.g., 206A and 206B) in vehicle 102.

In block 310, a seat in the cargo space is moved from a first position to a second position according to the determined cargo space configuration. Actuators (e.g., 104) can be used to move the seats to the determined positions automatically after a configuration is determined or in response to a user input (e.g., a user input that confirms the determined configuration is acceptable). Alternatively, or in addition, the device displays, on a display, visual instructions (e.g., textual instructions, graphical instructions, video, images) for reconfiguring the cargo space (e.g., to move the seat from the first position to the second position). Alternatively, or in addition, the device outputs, via a speaker, audio instructions for reconfiguring the cargo space (e.g., to move the seat from the first position to the second position).

The configuration of a cargo space can also include the state of other features such as barriers, nets, and attachment devices. Exemplary states of barriers and/or nets include raised, lowered, retracted, extended, etc. Similar to movement of the seats, barriers, nets, and the like may be moved automatically or manually using an actuator. Exemplary states of attachment devices include engaged, disengaged, etc.

The layout of the set of cargo items includes positions within the cargo space of one or more of the cargo items. The position of an item includes its location (e.g., relative to the cargo space or other items), the orientation of the item (e.g., upright, laid flat, upside down, tilted, etc.), and/or a configuration of the cargo item, such as the cargo item configurations described above. The layout may also include an indication of whether a cargo item is to be secured. After the cargo items are loaded, designated items can be secured automatically or in response to a user input. For example, system 100 may actuate mechanical and/or magnetic clamps at attachment points. Alternatively, the system may provide manual controls (e.g., mechanical or electrical controls, levers, or the like) to actuate attachment devices. The system may also deploy partitions (e.g., nets) as specified in the determined cargo space configuration.

In addition, after the cargo space configuration and layout of cargo items are determined, a representation of the cargo space configured according to the determined configuration and/or the cargo items arranged according to the determined layout may be displayed (e.g., on display 116). The representation may include a schematic of the vehicle and layout in order to allow the user to visualize the layout.

The configuration of the cargo space can be determined based at least in part on the number and characteristics of the cargo items. The layout of the set of cargo items can also be determined based at least in part on the number and characteristics of the cargo items.

In some embodiments, a configuration of the cargo space is determined based at least in part on a particular layout of the set of cargo items (e.g., the layout is determined first and the configuration is determined based on the layout). In some embodiments, a layout is determined based at least in part on a particular configuration of the cargo space (e.g., the configuration is determined first and the layout is determined based on the configuration). In some embodiments, determining a configuration of the cargo space and a layout of the set of cargo items is an iterative process in which an initial configuration and/or layout is determined and then changed to improve or optimize the final configuration and layout.

In some embodiments, a configuration of the cargo space and a layout of cargo items are determined to ensure that all of the cargo items fit in the cargo space. An optimum cargo space configuration and cargo item layout may be determined that accommodates the maximum the amount of cargo items or provides the maximum amount of free space for passengers while also accommodating the maximum number of cargo items.

Figure 6A:
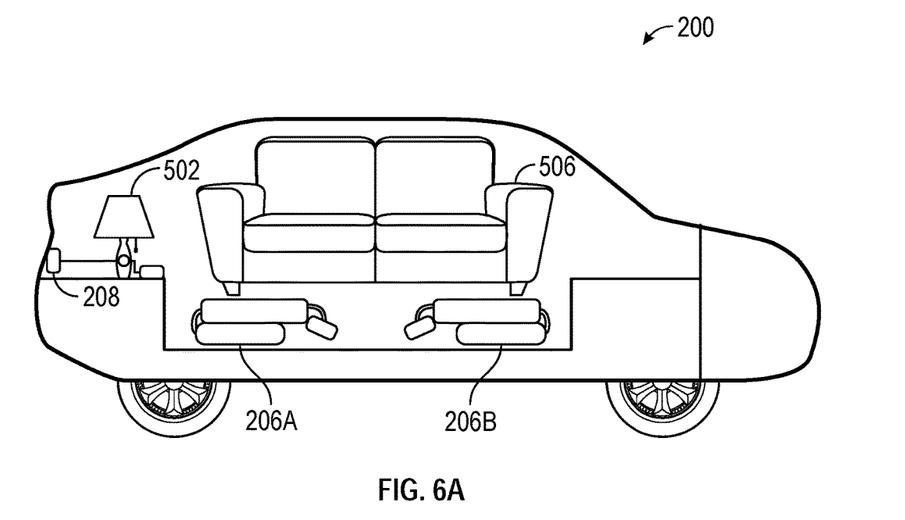
FIGS. 6A-6B illustrate an exemplary vehicle for transporting cargo items in accordance with some embodiments.

FIG. 6A illustrates an exemplary cargo space configuration and cargo item layout based on the cargo space 202 in vehicle 200 and cargo items 502, 504, and 506. In the cargo space configuration illustrated in FIG. 6A, the seats are separated, facing each other, and folded down (e.g., stowed horizontally). In the layout, cargo item 506 is positioned upright on top of the seats and cargo item 502 is positioned upright and to the left of cargo item 506. Cargo item 502 is also secured to attachment points 208.

Notably, cabinet 504 is not included in the layout shown in FIG. 6A. In some embodiments, the determined layout does not include all of the identified cargo items if, for example, it is determined that the cargo space cannot accommodate all of the cargo items simultaneously. Even if all cargo items cannot be transported simultaneously, a configuration and/or layout may be determined to maximize the amount of utilized cargo space. Additionally, a notification may be provided to the user that all of the items cannot be transported simultaneously and/or that particular items cannot be transported. The user may then be able to select which items to include (or not include) in the layout. In addition, the system optionally specifies the number or type of vehicles required to accommodate all of the items.

In some embodiments, a predetermined set of cargo space configurations is provided. For example, any of the configurations illustrated in FIGS. 2, 4A-4C, and 6A-6B may be a predetermined configuration. In such embodiments, configuration of the cargo space may be determined by selecting one of the predetermined cargo space configurations. For example, the predetermined cargo space may be selected based on a determination that it accommodates the maximum amount of cargo items or provides the maximum amount of free space for passengers while also accommodating the maximum number of cargo items, compared to the other predetermined cargo space configurations.

In some embodiments, designated configurations are provided. For example, a user may designate a favorite or commonly used configuration for easy reference. The designated configurations may be associated with a particular activity, event, place, or the like (e.g., product delivery, soccer practice, home supply store), which may involve, for example, different numbers of passengers, varying amounts of storage, and different kinds of cargo items. A user may also specify a custom configuration in which the user specifies the parameters of the configuration. In some embodiments, the user can specify a particular cargo space configuration and request that the system determine a layout of a set of cargo items based on the specified configuration and the set of cargo items.

In some embodiments, a specific position for a particular item is determined based on one or more characteristics of that item. For example, cargo items located near the perimeter of a vehicle may be more likely to be damaged during a collision or impact due to compression of the vehicle. Accordingly, the system optionally determines a relatively centralized location (e.g., not along the perimeter of the vehicle) for an item that is determined to be fragile or of relatively high value or importance.

Figure 6B:
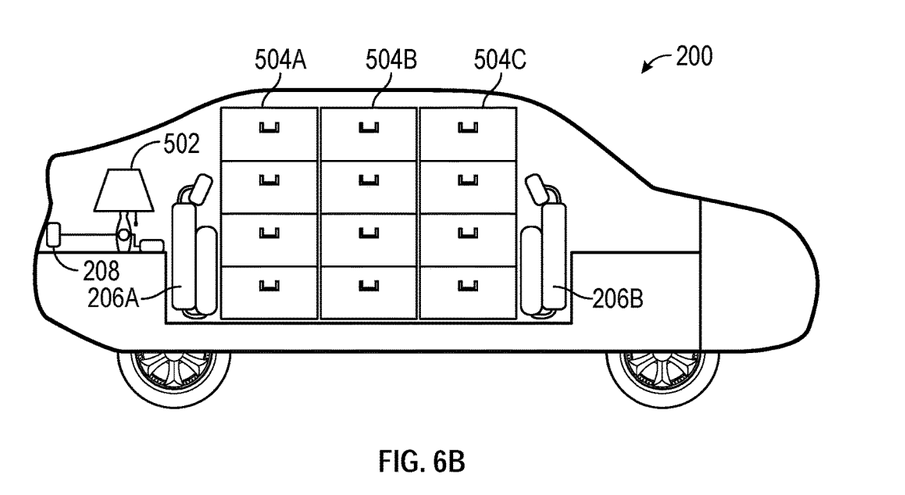

In some embodiments, a specific position for a particular type of item is determined. For example, if a set of cargo items consists of ten identical boxes, the vehicle may determine a layout of the boxes without necessarily specifying which specific box belongs in which specific position. FIG. 6B illustrates a cargo space configuration and layout determined for lamp 502 and three file cabinets 504A, 504B, and 504C, which are each identical to file cabinet 504. In contrast to the configuration illustrated in FIG. 6A, seats 206A and 206B are positioned in an upright stowed configuration to allow for the height of the file cabinets. Notably, the sofa 506 would not fit in the configuration illustrated in FIG. 6B, as the sofa 506 is too long to fit between the seats when the sofa 506 is oriented horizontally, and the cargo space is not tall enough for the sofa 506 to fit when oriented vertically. Similarly, the file cabinets 504A, 504B, and 504C would not fit in the configuration illustrated in FIG. 6A. A single file cabinet 504 may fit in the configuration illustrated in FIG. 6A if oriented horizontally, but not all three.

In some embodiments, a specific position is determined in which a particular cargo item (or cargo item with one or more particular characteristics) should not be placed. A disfavored position may be identified for safety reasons or to avoid damage to the vehicle or cargo item. In some embodiments, it may be determined that one or more cargo items cannot be stored and/or transported due to safety concerns instead of, or in addition to, a lack of space.

In some embodiments, a position of an item is determined based on a determination that the item needs to be secured. A determination may be made that the item needs to be secured based on a specific input from the user, a parameter in a database, and/or an estimate based on the size, shape, mass, or other characteristics of the cargo item. For example, a cargo item may be characterized as fragile or light, such that it cannot be stacked under other items but is likely to move around if left unsecured. It may also be determined that a cargo item should be secured if its mass is unknown or cannot be estimated with sufficient confidence.

If it is determined that an item needs to be secured, a position within the cargo space is determined in which the cargo item is, or can be, secured. This has the potential benefit of improving the safety of passengers, the vehicle, and the cargo items, including both the identified item itself and surrounding items, by preventing the identified items from striking passengers or damaging the vehicle or other items during transportation.

A cargo item can be secured in various ways. One way is to place the cargo item in a confined position in the layout. For example, the cargo item can be positioned against, or surrounded by, other items, a wall, the floor, a seat, and/or other structures within the cargo space. In some embodiments, the cargo space includes fixed or removable partitions, nets, or the like, which may be used (e.g., deployed, adjusted, etc.) to secure cargo items. Another way is to tie-down the cargo item or fasten it to the vehicle or other cargo items. A vehicle may include custom or dedicated tie-down or attachment points. It may also be possible to tie-down or fasten a cargo item to other structures of the vehicle, such as the seats, handles, rails, etc. A preferred attachment technique and/or point of restraint may be determined based on the characteristics of the cargo item and the cargo space, including what types of fasteners are compatible with the cargo item and the vehicle.

In some embodiments, a cargo space configuration and/or cargo item layout is determined based at least in part on one or more constraints imposed on the cargo space configuration and/or cargo item layout. A constraint applied to the cargo space configuration or layout of cargo items is not to be confused with the restraints, connectors, fasteners, attachments, and other techniques for securing a cargo item discussed above. Exemplary constraints include, but are not limited to, a required position for a particular cargo item or seat, a specific portion of the interior space that cannot be occupied, the number of passengers that must be accommodated in the interior space, a maximum allowable total mass, and a requirement that a cargo item must be secured. Specifying the number of passengers that must be accommodated, for example, requires that the number of non-stowed seats be at least equal to the number of passengers and that these seats be configured to accommodate a person (e.g., a substantially upright seatback configuration). In another example, the number of cargo items in a layout may be limited or it may be determined that additional cargo space (e.g., an additional vehicle) is required to avoid exceeding a maximum allowable cargo item mass (e.g., the maximum mass allowable to safely operate a vehicle). In some embodiments, a user may be permitted to specify that a cargo item must be transported upright or that it can safely be laid down.

In some embodiments, a set of cargo items is divided into groups, with each group including one or more of the cargo items. A user may specify the order in which the groups of cargo items are intended to be loaded into the vehicle. For instance, a user may desire to pick up one or more items from each of two or more different locations. A configuration of the cargo space and a layout of the cargo items may then be determined based on the cargo items, groups, and specified order. In some embodiments, multiple cargo space configurations and cargo item layouts may be determined based on the cargo items, groups, and specified order. For instance, a first vehicle configuration and layout may be determined for the first group and a second vehicle configuration and layout may be determined for the combination of the first and second groups. Different configurations and/or layouts may be desirable to ensure that the cargo items in the first group are secure before the second group is loaded, and that all of the loaded cargo items are secure after the second group is loaded.

In some embodiments, the user does not specify the order in which the groups of cargo items are to be loaded into the vehicle. Rather, the system (e.g., system 100) determines the order in which the groups of cargo items are to be loaded into the vehicle along with corresponding vehicle configurations and layouts. The system may determine the order of the groups, configurations, and/or layouts to ensure that all of the cargo items can be transported safely while minimizing the number of items that need to be rearranged to load each group.

The set of cargo items can also be divided into loading groups (e.g., corresponding to pickups) and unloading groups (e.g., corresponding to drop-offs or deliveries). For example, a set of cargo items may include hypothetical cargo items A, B, and C, which may be divided into one loading group consisting of A, B, and C, and two unloading groups, one consisting of A and C, and one consisting of B. In some embodiments, a user specifies the order in which the groups are to be loaded and unloaded. The system (e.g., system 100) then determines cargo space configurations and cargo item layouts based on the specified order to ensure that all of the cargo items can be transported safely while minimizing the number of items that need to be rearranged between loading and unloading the groups. Alternatively, the system can determine the order in which the groups are to be loaded and unloaded along with corresponding cargo space configurations and cargo item layouts. The system may determine the order, configurations, and/or layouts to ensure that all of the cargo items can be transported safely while minimizing the number of items that need to be rearranged between loading and unloading the groups.

As discussed above, a cargo space can include spaces in more than one vehicle. In some embodiments, the system (e.g., system 100) determines, based on a set of cargo items, a cargo space that can accommodate the entire set of cargo items. The determined cargo space may include more than one vehicle and/or a particular type or types of vehicles. In this way, a user can be provided with the number of vehicles and/or the type(s) of vehicles that he or she will need to transport an entire set of cargo items. For example, a user may scan the rooms of a house (e.g., using a camera and/or application on a smartphone) to create an inventory of furniture items that need to be moved. The system and/or the user characterizes the furniture items and determines the cargo space of available vehicles (e.g., via lookup in memory or a database). The system then determines the number and types of vehicles required to move the inventory of furniture items. For example, a system may determine that three vehicles of type A and one vehicle of type B are required. A user may provide the types of vehicles that are available. Alternatively, the system may select the types of vehicles from an existing database. In addition, the system may determine a layout of the furniture items for each vehicle (e.g., which items are to be loaded in which vehicle).

In some embodiments, one or more operating parameters of the vehicle are determined based at least in part on the characteristics of the cargo items to be loaded. Operating parameters include parameters related to driving characteristics and/or safety features. Exemplary operating parameters that may be adjusted based on the characteristics of the cargo items include, but are not limited to, speed, acceleration, braking, following distance, airbag activation or deployment, suspension settings, collision avoidance criteria, etc. For example, minimum following distance may be increased if it is determined that the combined mass of the cargo items in the vehicle is greater than a threshold amount or there is an item of significant value being transported. In another example, airbags may be deactivated if it is determined that there are no passengers in the interior space (e.g., the vehicle is being used just for transportation of cargo).

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Other embodiments within the scope of the disclosure do not necessarily include all of the features described above and may include various combinations of the described features and/or additional features. Others skilled in the art are thereby enabled to best use the techniques and various embodiments with various modifications as are suited to the particular use contemplated. For example, the techniques discussed above are described with respect to vehicle 200 but may be applied to other vehicles, objects, structures, buildings, areas, etc.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for storing cargo items, comprising:
   at an electronic device with one or more processors, memory, and a first sensor:
      determining, using the one or more processor and based on data received from the first sensor, characteristics of a cargo space, wherein the cargo space includes at least one seat, wherein the at least one seat is capable of being moved between a first position within the cargo space and a second position within the cargo space;
      determining, using the one or more processors, a set of cargo items including one or more cargo items to be positioned in the cargo space;
      determining, using the one or more processors, a configuration of the cargo space based at least in part on the set of cargo items, wherein the configuration of the cargo space includes the second position of the at least one seat;
      determining, using the one or more processors, a layout of the set of cargo items within the cargo space based at least in part on the set of cargo items and the determined configuration; and
      providing, using the one or more processors, a signal to cause movement of the at least one seat from the first position to the second position.

2. The method of claim 1, wherein determining the set of cargo items includes determining the size and shape of the one or more cargo items, and wherein the configuration of the cargo space or the layout of the set of cargo items are determined based at least in part on the size and shape of the one or more cargo items.

3. The method of claim 1, wherein determining the set of cargo items includes determining a mass of at least one cargo item in the set of cargo items, and wherein the configuration of the cargo space or the layout of the set of cargo items are determined based at least in part on the mass of the at least one cargo item.

4. The method of claim 1, wherein the set of cargo items is determined at least in part by a user input.

5. The method of claim 1, wherein the set of cargo items is determined at least in part by detecting at least one of the cargo items using a second sensor.

6. The method of claim 5, wherein the second sensor is included in a smartphone.

7. The method of claim 5, wherein the cargo space includes space in a vehicle, and wherein vehicle includes the second sensor.

8. A device, comprising:
   a first sensor;
   one or more processors;
   a memory; and
   one or more programs, wherein the one or more programs are stored in the memory and configured to be executed by the one or more processors, the one or more programs including instructions for:
      determining, based on data from the first sensor, characteristics of a cargo space, wherein the cargo space includes at least one seat, wherein the at least one seat is capable of being moved between a first position within the cargo space and a second position within the cargo space;
      determining a set of cargo items including one or more cargo items to be positioned in the cargo space;
      determining a configuration of the cargo space based at least in part on the set of cargo items, wherein the configuration of the cargo space includes the second position of the at least one seat;
      determining a layout of the set of cargo items within the cargo space based at least in part on the set of cargo items and the determined configuration; and
      providing a signal to cause movement of the at least one seat from the first position to the second position.

9. The device of claim 8, wherein determining the set of cargo items includes determining the size and shape of the one or more cargo items, and wherein the configuration of the cargo space or the layout of the set of cargo items are determined based at least in part on the size and shape of the one or more cargo items.

10. The device of claim 8, wherein determining the set of cargo items includes determining a mass of at least one cargo item in the set of cargo items, and wherein the configuration of the cargo space or the layout of the set of cargo items are determined based at least in part on the mass of the at least one cargo item.

11. The device of claim 8, wherein the set of cargo items is determined at least in part by a user input.

12. The device of claim 8, wherein the set of cargo items is determined at least in part by detecting at least one of the cargo items using a second sensor.

13. The device of claim 12, wherein the second sensor is included in a smartphone.

14. The device of claim 12, wherein the cargo space includes space in a vehicle, and wherein vehicle includes the second sensor.

15. A non-transitory computer-readable storage medium storing one or more programs, the one or more programs comprising instructions, which when executed by one or more processors of an electronic device with a first sensor, cause the electronic device to:
   determine, based on data from the first sensor, characteristics of a cargo space, wherein the cargo space includes at least one seat, wherein the at least one seat is capable of being moved between a first position within the cargo space and a second position within the cargo space;
   determine a set of cargo items including one or more cargo items to be positioned in the cargo space;
   determine a configuration of the cargo space based at least in part on the set of cargo items, wherein the configuration of the cargo space includes the second position of the at least one seat;

determine a layout of the set of cargo items within the cargo space based at least in part on the set of cargo items and the determined configuration; and provide a signal to cause movement of the at least one seat from the first position to the second position.

16. The non-transitory computer-readable storage medium of claim 15, wherein determining the set of cargo items includes determining the size and shape of the one or more cargo items, and wherein the configuration of the cargo space or the layout of the set of cargo items are determined based at least in part on the size and shape of the one or more cargo items.

17. The non-transitory computer-readable storage medium of claim 15, wherein determining the set of cargo items includes determining a mass of at least one cargo item in the set of cargo items, and wherein the configuration of the cargo space or the layout of the set of cargo items are determined based at least in part on the mass of the at least one cargo item.

18. The non-transitory computer-readable storage medium of claim 15, wherein the set of cargo items is determined at least in part by a user input.

19. The non-transitory computer-readable storage medium of claim 15, wherein the set of cargo items is determined at least in part by detecting at least one of the cargo items using a second sensor.

20. The non-transitory computer-readable storage medium of claim 19, wherein the second sensor is included in a smartphone.

21. The non-transitory computer-readable storage medium of claim 19, wherein the cargo space includes space in a vehicle, and wherein vehicle includes the second sensor.

* * * * *